US011812472B2

(12) United States Patent
Patil et al.

(10) Patent No.: US 11,812,472 B2
(45) Date of Patent: *Nov. 7, 2023

(54) METHODS AND SYSTEMS FOR IMPROVED RESOURCE UNIT UTILIZATION

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US); Guido Robert Frederiks, Watsonville, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

This patent is subject to a terminal disclaimer.

(21) Appl. No.: 17/061,120

(22) Filed: Oct. 1, 2020

(65) Prior Publication Data
US 2021/0029747 A1 Jan. 28, 2021

Related U.S. Application Data

(63) Continuation of application No. 15/954,383, filed on Apr. 16, 2018, now Pat. No. 10,798,743.
(Continued)

(51) Int. Cl.
*H04W 4/00* (2018.01)
*H04W 74/08* (2009.01)
(Continued)

(52) U.S. Cl.
CPC ..... *H04W 74/0833* (2013.01); *H04W 74/006* (2013.01); *H04W 74/0825* (2013.01);
(Continued)

(58) Field of Classification Search
CPC .......... H04W 74/0833; H04W 74/006; H04W 74/0825; H04W 48/12; H04W 74/02;
(Continued)

(56) References Cited

U.S. PATENT DOCUMENTS

| 5,235,599 A | 8/1993 | Nishimura et al. |
| 5,420,851 A * | 5/1995 | Seshadri ............... H04W 16/02 370/347 |

(Continued)

FOREIGN PATENT DOCUMENTS

| CN | 102665282 A | 9/2012 |
| CN | 103733675 A | 4/2014 |

(Continued)

OTHER PUBLICATIONS

Taiwan Search Report—TW107113279—TIPO—dated Dec. 17, 2020.
(Continued)

*Primary Examiner* — Stephen M D Agosta
(74) *Attorney, Agent, or Firm* — Holland & Hart / Qualcomm

(57) ABSTRACT

Disclosed are methods and systems for wireless communication. In one aspect, a method includes generating, by an access point, a frame, the frame assigning first resource units to first devices participating in a multi-user transmission with the access point during a transmission opportunity, and further indicating second resource units available during the transmission opportunity for transmissions to other devices, transmitting the frame; and receiving the multi-user transmission from the first devices according to the resource unit assignments.

19 Claims, 8 Drawing Sheets

Related U.S. Application Data

(60) Provisional application No. 62/488,582, filed on Apr. 21, 2017.

(51) Int. Cl.
 *H04W 74/00* (2009.01)
 *H04W 84/12* (2009.01)
 *H04B 17/318* (2015.01)
 *H04W 74/02* (2009.01)
 *H04W 48/12* (2009.01)

(52) U.S. Cl.
 CPC ........... *H04B 17/318* (2015.01); *H04W 48/12* (2013.01); *H04W 74/02* (2013.01); *H04W 84/12* (2013.01)

(58) Field of Classification Search
 CPC .... H04W 84/12; H04B 17/318; H04L 5/0044; H04L 1/1671; H04L 1/1812; H04L 1/1861; H04L 12/1407; H04L 29/06068; H04J 11/00; H04J 11/0023; H04J 11/005
 See application file for complete search history.

(56) References Cited

U.S. PATENT DOCUMENTS

| | | | |
|---|---|---|---|
| 10,009,930 B2* | 6/2018 | Kim | H04W 72/0413 |
| 10,034,227 B1* | 7/2018 | Jiang | H04W 48/14 |
| 10,154,520 B1 | 12/2018 | Hedayat et al. | |
| 10,219,271 B1* | 2/2019 | Hedayat | H04L 5/0055 |
| 10,420,148 B2 | 9/2019 | Adachi et al. | |
| 10,887,121 B2* | 1/2021 | Morioka | H04L 1/1864 |
| 2008/0075116 A1 | 3/2008 | Holierhoek et al. | |
| 2009/0141837 A1 | 6/2009 | Vasudevan et al. | |
| 2010/0281339 A1* | 11/2010 | Myers | H04L 1/0038 714/752 |
| 2011/0170443 A1 | 7/2011 | Murias et al. | |
| 2012/0082040 A1* | 4/2012 | Gong | H04W 74/0816 370/252 |
| 2012/0189006 A1* | 7/2012 | Isobe | H04L 47/801 370/389 |
| 2013/0286959 A1* | 10/2013 | Lou | H04L 27/2602 370/329 |
| 2014/0283062 A1 | 9/2014 | Kamthe | |
| 2014/0355507 A1 | 12/2014 | Amerga et al. | |
| 2016/0092257 A1* | 3/2016 | Wang | G06F 9/45558 718/1 |
| 2016/0128024 A1 | 5/2016 | Frederiks et al. | |
| 2016/0135224 A1 | 5/2016 | Lee et al. | |
| 2016/0165589 A1* | 6/2016 | Chu | H04W 72/0413 370/329 |
| 2016/0227572 A1* | 8/2016 | Li | H04W 72/0453 |
| 2016/0234831 A1* | 8/2016 | Tian | H04L 1/1896 |
| 2016/0309469 A1* | 10/2016 | Shu | H04W 74/0816 |
| 2016/0360507 A1* | 12/2016 | Cariou | H04L 5/00 |
| 2016/0381664 A1* | 12/2016 | Ghosh | H04L 69/22 370/329 |
| 2017/0013493 A1 | 1/2017 | Homchaudhuri et al. | |
| 2017/0013607 A1* | 1/2017 | Cariou | H04B 7/2603 |
| 2017/0026981 A1* | 1/2017 | Cariou | H04W 72/0453 |
| 2017/0085306 A1 | 3/2017 | Cariou et al. | |
| 2017/0086214 A1* | 3/2017 | Kalhan | H04W 24/10 |
| 2017/0279568 A1 | 9/2017 | Huang et al. | |
| 2018/0020372 A1* | 1/2018 | Viger | H04W 28/0278 |
| 2018/0020373 A1* | 1/2018 | Viger | H04W 72/52 |
| 2018/0184429 A1* | 6/2018 | Gan | H04L 5/0094 |
| 2018/0302858 A1* | 10/2018 | Son | H04W 74/08 |
| 2018/0302930 A1* | 10/2018 | Wang | H04W 76/10 |
| 2018/0310342 A1* | 10/2018 | Patil | H04W 74/0825 |
| 2019/0059085 A1 | 2/2019 | Sun et al. | |
| 2019/0349927 A1* | 11/2019 | Qin | H04W 72/1263 |
| 2020/0014576 A1* | 1/2020 | Cherian | H04W 72/121 |
| 2021/0144752 A1* | 5/2021 | Chen | H04W 72/02 |
| 2021/0289501 A1* | 9/2021 | Xin | H04W 72/042 |
| 2022/0046432 A1* | 2/2022 | Li | H04W 8/26 |
| 2022/0272715 A1* | 8/2022 | Iwai | H04W 72/1263 |

FOREIGN PATENT DOCUMENTS

| | | |
|---|---|---|
| CN | 105191203 A | 12/2015 |
| CN | 106550478 A | 3/2017 |
| EP | 3146781 A1 | 3/2017 |
| GB | 2539693 A | 12/2016 |
| GB | 2540213 A | 1/2017 |
| WO | WO-2016069399 A1 | 5/2016 |
| WO | WO-2016207071 A1 | 12/2016 |

OTHER PUBLICATIONS

European Search Report—EP21214115—Search Authority—The Hague—dated Feb. 22, 2022.

Banerjea R., et al., (Qualcomm): "Ib225-mac-cr-9-3-1-23 11", Comment resolution for section 9.3.1.23 , IEEE Draft; 11-17-0283-06-00AX-LB225-MAC-CR-9-3-1-23, IEEE-SA Mentor, Piscataway, NJ USA, vol. 802.11ax, No. 6, Mar. 16, 2017, XP068115278, Retrieved from the Internet: https://mentor.ieee.org/802.11/dcn/17/11-17-0283-06-00ax-lb225-rnac-cr-9-3-1-23.docx [retrieved on Mar. 16, 2017], pp. 1-10.

Ghosh C (Intel): "Random Access with Trigger Frames using OFDMA; 11-15-0604-00-00ax-random-access-with-trig ger-frames-using-ofdma," IEEE Draft; 11-15-0604-00-00AX-Random-Access-With-Trig Ger-Frames-Using-OFDMA, IEEE-SA Mentor, Piscataway, NJ USA, vol. 802.11ax, May 11, 2015 (May 11, 2015), pp. 1-16, XP068094472. [retrieved on May 11, 2015].

International Preliminary Report on Patentability—PCT/US2018/027974, The International Bureau of WIPO—Geneva, Switzerland, dated Oct. 31, 2019.

International Search Report and Written Opinion—PCT/US2018/027974—ISA/EPO—dated Jul. 10, 2018.

Nezou P., et al., (Canon): "Issues Related to OCW Management", IEEE Draft; 11-16-0591-01-00AX-Issues-Related-to-OCW-Management, IEEE-SA Mentor, Piscataway, NJ, USA, vol. 802.11ax, No. 1, May 18, 2016, XP068119402, Retrieved from the Internet: URL:https://mentor.ieee.org/802.11/dcn/16/11-16-0591-01-00ax-issues-related-to-ocw-management.pptx [retrieved on May 18, 2016], pp. 1-12.

Patil A., (Qualcomm): "CIDs Related to Random Access", IEEE Draft; 11-17-0229-02-00AX-CIDs-Related-to-Random-Access, IEEE-SA Mentor, Piscataway, NJ USA, vol. 802.11ax, No. 2, Mar. 10, 2017, XP068115214, Retrieved from the Internet: https://mentor.ieee.org/802.11/dcn/17/11-17-0229-02-00ax-cids-related-to-randomaccess.docx [retrieved on Mar. 10, 2017], pp. 1-14.

\* cited by examiner

METHODS AND SYSTEMS FOR IMPROVED RESOURCE UNIT UTILIZATION

CROSS REFERENCE TO RELATED APPLICATIONS

This application is a continuation and claims the benefit of U.S. application Ser. No. 15/954,383 entitled "METHODS AND SYSTEMS FOR IMPROVED RESOURCE UNIT UTILIZATION" and filed on Apr. 16, 2018, which claims the benefit of U.S. Provisional Application No. 62/488,582 titled "METHODS AND SYSTEMS FOR IMPROVED RESOURCE UNIT UTILIZATION," filed Apr. 21, 2017, all of which are assigned to the assignee hereof. The disclosures of all prior Applications are considered part of and are incorporated by reference in this Patent Application in their respective entireties.

TECHNICAL FIELD

This application relates generally to wireless communication, and more specifically to systems and methods for detecting and characterizing additional access points so as to enable utilization of an access point providing a highest level of service for a station.

BACKGROUND

Wireless communications systems are widely deployed to provide various types of communication content such as voice, video, packet data, messaging, broadcast, and so on. Wi-Fi or WiFi (e.g., IEEE 802.11) is a technology that allows electronic devices to connect to a wireless local area network (WLAN). A WiFi network may include an access point (AP) that may communicate with one or more other electronic devices (e.g., computers, cellular phones, tablets, laptops, televisions, wireless devices, mobile devices, "smart" devices, etc.), which can be referred to as stations (STAs). The AP may be coupled to a network, such as the Internet, and may enable one or more STAs to communicate via the network or with other STAs coupled to the AP.

Many wireless networks utilize carrier-sense multiple access with collision detection (CSMA/CD) to share a wireless medium. With CSMA/CD, before transmission of data on the wireless medium, a device may listen to the medium to determine whether another transmission is in progress. If the medium is idle, the device may attempt a transmission, and may listen to the medium during the transmission to detect whether the data was successfully transmitted, or if there was a collision. When a collision is detected, the device may wait for a period of time and then re-attempt the transmission. The use of CSMA/CD allows for a single device to utilize a particular channel of a wireless network.

Users continue to demand greater and greater capacity from their wireless networks. For example, video streaming over wireless networks is becoming more common. Video teleconferencing may also place additional capacity demands on wireless networks. In order to satisfy the bandwidth and capacity requirements users require, improvements in the ability of a wireless medium to carry larger and larger amounts of data are needed.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication. In some implementations, the method may be performed by an apparatus of a wireless access point, and may include generating a frame assigning first resource units to first devices participating in a multi-user transmission with the access point during a transmission opportunity, the frame indicating second resource units unavailable for transmission during the transmission opportunity. The method also may include transmitting the frame, and receiving the multi-user transmission from the first devices according to the first resource units assigned in the frame. In some instances, the frame also may include a predetermined association identifier to indicate that the second resource units are unavailable for transmission during the transmission opportunity. In other instances, the frame also may indicate a received signal strength threshold. In some other instances, the frame also may indicate one or more criteria for utilizing the second resource units.

The method also may include indicating, based on the indication that the second resource units are unavailable for transmission during the transmission opportunity, that the second resource units are available for use by one or more other devices. In other implementations, the frame may indicate whether the access point permits one or more other devices to utilize the second resource units. In some instances, the frame also may indicate a received signal strength (RSSI) limit for the frame, the frame indicating that if the RSSI of the frame when received is above the limit, the second resource units are unavailable for transmission during the transmission opportunity. In some implementations, the method also may include determining that the second resource units are subject to interference, and generating the frame to indicate the determination.

Another innovative aspect of the subject matter described in this disclosure can be implemented as a method for wireless communication. In some implementations, the method may be performed by an apparatus of a wireless communication device, and may include receiving a frame from an access point over a wireless network, decoding the frame to determine resource units unavailable for transmission during a transmission opportunity, and transmitting data to a second wireless device using at least a portion of the determined resource units. In some instances, the method also may include performing a back-off procedure during the transmission opportunity, and determining that the resource units are unavailable for transmission during the transmission opportunity based on the identification. In some other instances, the method also may include indicating, based on the determination that the second resource units are unavailable for transmission during the transmission opportunity, that the second resource units are available for use by one or more other devices.

In some implementations, the method also may include decoding the frame to identify one or more criteria for use of the second resource units, and transmitting the data in response to the criteria being met. In some instances, the method also may include decoding the frame to determine whether the access point permits one or more other devices to utilize the second resource units.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Figure 1:
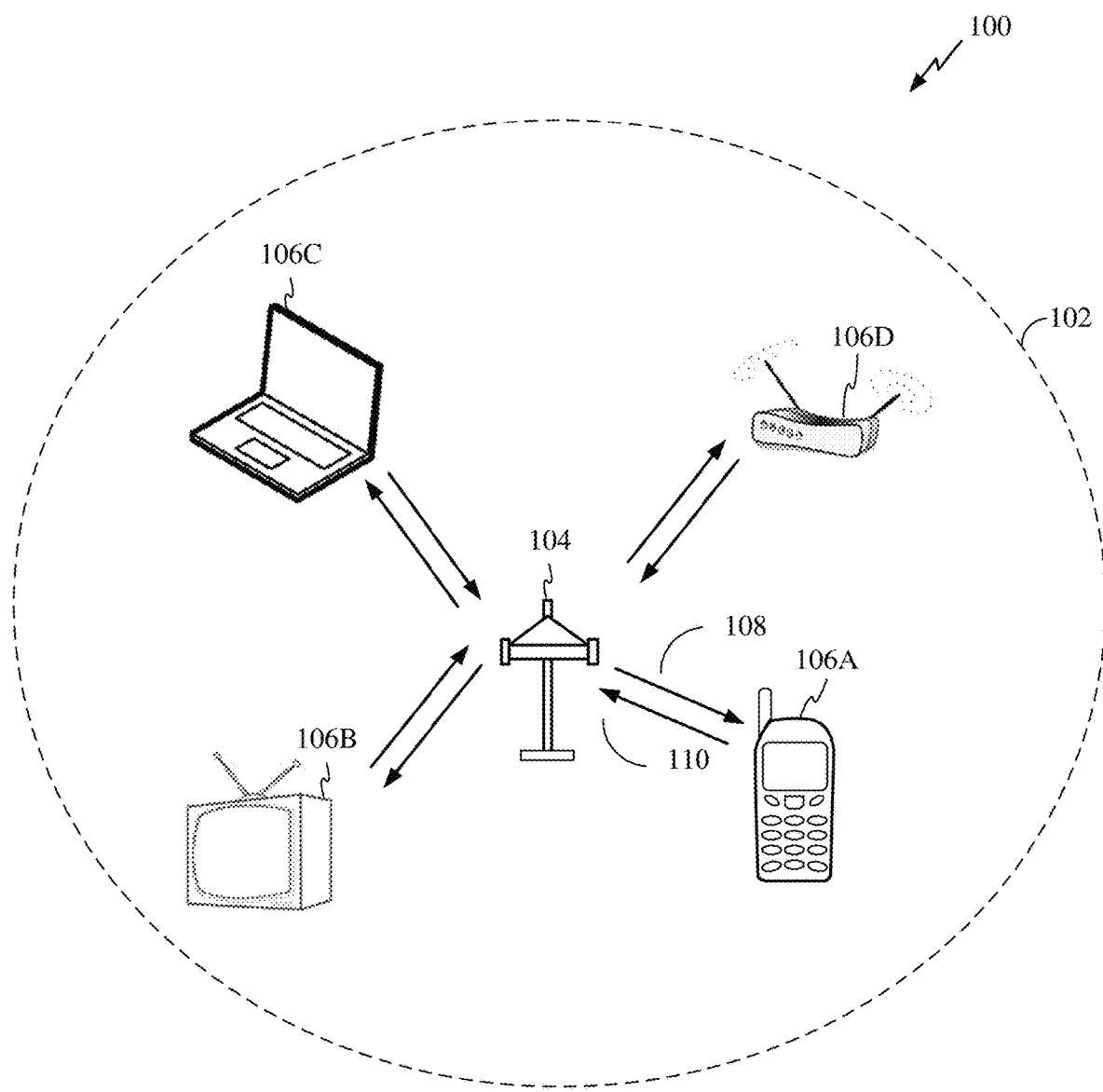
FIG. 1 is a diagram that illustrates a multiple-access multiple-input multiple-output (MIMO) system 100 with APs and STAs.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently or combined with any other aspect of the disclosure. In addition, the scope is intended to cover such an apparatus or method which is practiced using other structure and functionality as set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The word "exemplary" is used herein to mean "serving as an example, instance, or illustration." Any implementation described herein as "exemplary' is not necessarily to be construed as preferred or advantageous over other implementations. The following description is presented to enable any person skilled in the art to make and use the embodiments described herein. Details are set forth in the following description for purpose of explanation. It should be appreciated that one of ordinary skill in the art would realize that the embodiments may be practiced without the use of these specific details. In other instances, well known structures and processes are not elaborated in order not to obscure the description of the disclosed embodiments with unnecessary details. Thus, the present application is not intended to be limited by the implementations shown but is to be accorded with the widest scope consistent with the principles and features disclosed herein.

Wireless access network technologies may include various types of wireless local area access networks (WLANs). A WLAN may be used to interconnect nearby devices together, employing widely used access networking protocols. The various aspects described herein may apply to any communication standard, such as Wi-Fi or, more generally, any member of the IEEE 802.11 family of wireless protocols.

In some implementations, a WLAN includes various devices which access the wireless access network. For example, there may be access points ("APs") and clients (also referred to as stations, or "STAs"). In general, an AP serves as a hub or a base station for the STAs in the WLAN. A STA may be a laptop computer, a personal digital assistant (PDA), a mobile phone, etc. In an example, an STA connects to an AP via a Wi-Fi (e.g., IEEE 802.11 protocol such as 802.11ah) compliant wireless link to obtain general connectivity to the Internet or to other wide area access networks. In some implementations an STA may also be used as an AP.

An access point ("AP") may comprise, be implemented as, or known as a NodeB, Radio Access network Controller ("RNC"), eNodeB ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") may also comprise, be implemented as, or known as a user terminal, an access terminal ("AT"), a subscriber station, a subscriber unit, a mobile station, a remote station, a remote terminal, a user agent, a user device, a user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, a Node-B (Base-station), or any other suitable device that is configured to communicate via a wireless medium.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). The cdma2000 is described in documents from an organization named "3rd Generation Partnership Project 2" (3GPP2). These various radio technologies and standards are known in the art.

FIG. 1 is a diagram that illustrates a multiple-access multiple-input multiple-output (MIMO) system 100 with APs and STAs. For simplicity, only one AP 104 is shown in FIG. 1. As described above, the AP 104 communicates with the STAs 106a-d (also referred to herein collectively as "the STAs 106" or individually as "the STA 106") and may also be referred to as a base station or using some other terminology. Also, as described above, a STA 106 may be fixed or mobile and may also be referred to as a user terminal, a mobile station, a wireless device, or using some other terminology. The AP 104 may communicate with one or more STAs 106 at any given moment on the downlink or uplink. The downlink (i.e., forward link) is the communication link from the AP 104 to the STAs 106, and the uplink (i.e., reverse link) is the communication link from the STAs 106 to the AP 104. A STA 106 may also communicate peer-to-peer with another STA 106.

Portions of the following disclosure will describe STAs 106 capable of communicating via Spatial Division Multiple Access (SDMA). Thus, for such aspects, the AP 104 may be configured to communicate with both SDMA and non-SDMA STAs. This approach may conveniently allow older versions of STAs (e.g., "legacy" STAs) that do not support SDMA to remain deployed in an enterprise, extending their useful lifetime, while allowing newer SDMA STAs to be introduced as deemed appropriate.

The MIMO system 100 may employ multiple transmit and multiple receive antennas for data transmission on the downlink and uplink. The AP 104 is equipped with Nap antennas and represents the multiple-input (MI) for downlink transmissions and the multiple-output (MO) for uplink transmissions. A set of K selected STAs 106 collectively represents the multiple-output for downlink transmissions and the multiple-input for uplink transmissions. For pure SDMA, it is desired to have Nap≤K≤1 if the data symbol streams for the K STAs are not multiplexed in code, frequency, or time by some means. K may be greater than Nap if the data symbol streams can be multiplexed using TDMA technique, different code channels with CDMA, disjoint sets of sub-bands with OFDM, and so on. Each selected STA may transmit user-specific data to and/or receive user-specific data from the AP. In general, each selected STA may be equipped with one or multiple antennas (i.e., Nut≥1). The K selected STAs can have the same number of antennas, or one or more STAs may have a different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each STA may be equipped with a single antenna (e.g., in order to keep costs down) or multiple antennas (e.g., where the additional cost can be supported). The MIMO system 100 may also be a TDMA system if the STAs 106 share the same frequency channel by dividing transmission/reception into different time slots, where each time slot may be assigned to a different STA 106.

Figure 2:
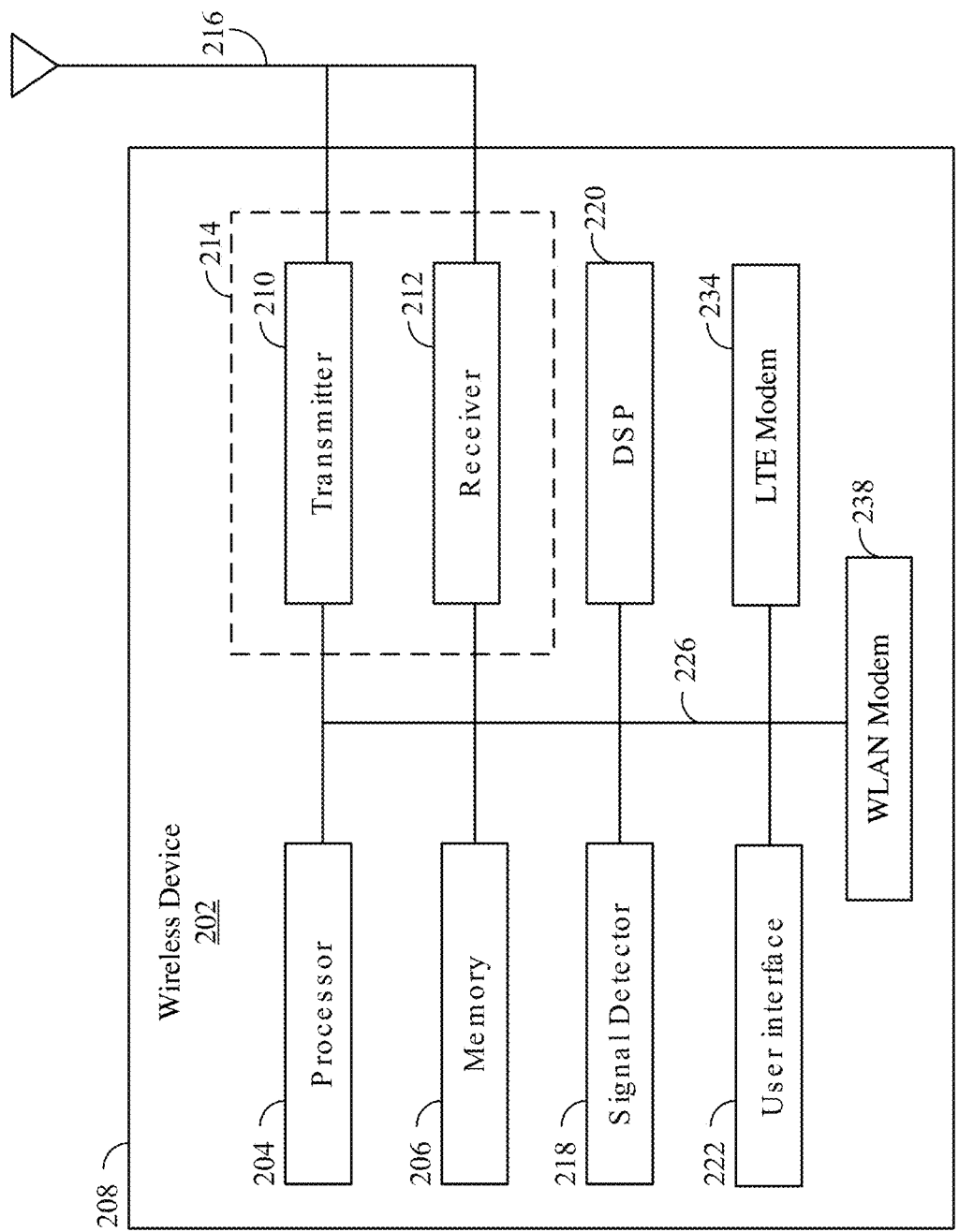
FIG. 2 illustrates various components that may be utilized in a wireless device 202 that may be employed within the wireless communication MIMO system of FIG. 1.

FIG. 2 illustrates various components that may be utilized in a wireless device 202 that may be employed within the wireless communication MIMO system 100. The wireless device 202 is an example of a device that may be configured to implement the various methods described herein. The wireless device 202 may implement an AP 104 or a STA 106.

The wireless device 202 may include an electronic hardware processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 may perform logical and arithmetic operations based on program instructions stored within the memory 206. The instructions in the memory 206 may be executable to implement the methods described herein.

The processor 204 may comprise or be a component of a processing system implemented with one or more electronic hardware processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transceiver antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. In some aspects, the wireless device may also include one or more of a user interface component 222, cellular modem 234, and a wireless lan (WLAN) modem. The cellular modem 234 may provide for communication using cellular technologies, such as CDMA, GPRS, GSM, UTMS, or other cellular networking technology. The modem 238 may provide for communications using one or more WiFi technologies, such as any of the IEEE 802.11 protocol standards.

The various components of the wireless device 202 may be coupled together by a bus system, which may include a power bus, a control signal bus, and a status signal bus in addition to a data bus.

Certain aspects of the present disclosure support transmitting an uplink (UL) signal or a downlink (DL) signal between one or more STAs and an AP. In some embodiments, the signals may be transmitted in a multi-user MIMO (MU-MIMO) system. Alternatively, the signals may be transmitted in a multi-user FDMA (MU-FDMA) or similar FDMA system.

Figure 3:
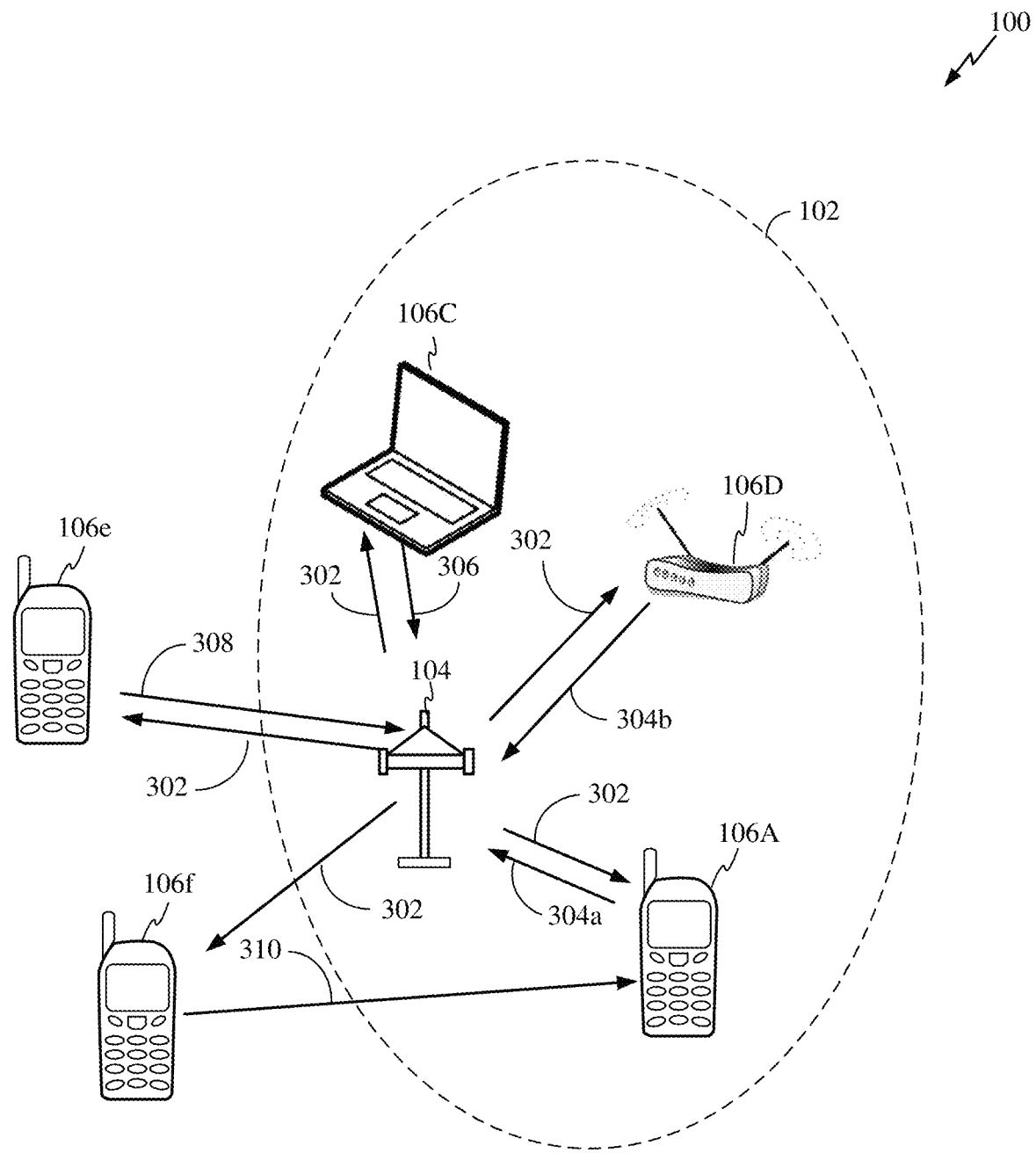
FIG. 3 illustrates another embodiment of the multiple-access multiple-input multiple-output (MIMO) system 100.

FIG. 3 illustrates another embodiment of the multiple-access multiple-input multiple-output (MIMO) system 100. FIG. 3 shows that stations 106a, 106c and 106d are within the basic service set (BSS) 102 of the AP 104. Stations 106e and 106f are unassociated with the AP 104. Since the stations 106a and 106d are associated with the AP 104, they may jointly participate in a multi-user communication with the AP 104. For example, in one aspect, the stations 106a and 106d may transmit, at least partially simultaneously, an uplink communication to the AP 104.

The AP 104 may facilitate uplink communication to it by transmitting a frame defining how resource units may be used during a transmission opportunity. In some aspects, a resource unit may be a smallest sub-channel within a particular 802.11 channel (e.g. 20, 40, 80, or 160 Mhz wide). Resource units may include any number of tones. For example, in some aspects, a resource unit may include 26 tones, 52 tones, 106 tones, or any number of tones. Each resource unit may define a number of subcarriers for use in a transmission.

The disclosed methods and systems may provide for at least four categories of transmissions and may identify one or more resource units for use in one or more of the four categories. The four categories are 1) uplink communications to an access point that are part of a multi-user transmission during a transmission opportunity of the access point 2) random access transmissions by associated devices to the access point. These transmissions may be performed according to a random access procedure, which works to mitigate collisions between devices attempting to transmit messages to the access point during the transmission opportunity using resource units identified for use in this category 3) random access transmissions by unassociated devices to the access point. These transmissions may also be performed according to a random access procedure, and 4) transmissions by devices (either associated with or unassociated with the access point) to other devices that are not the access point. Category four (4) transmissions may include, for example, peer to peer transmissions between stations that do not involve the access point. By identifying resource units for each of these four categories of transmissions, the disclosed methods and systems may result in improved utilization of the wireless medium.

In some aspects, an access point may also indicate one or more resource units that should not be utilized for transmissions by any devices, whether those transmissions are destined for the access point or destined for another device.

Category one (1) transmissions discussed above may occur based on timing information included in a trigger frame. For example, in some aspects, category one transmissions are initiated a predetermined time after transmission of the trigger frame, such as for example a short inter-frame space (SIFS) time. Categories two (2), three (3) and four (4) above may utilize a pre-transmission procedure before the transmissions occur. Categories two (2) and (3) may utilize a random access procedure. The random access procedure may reduce a risk of collision that could occur if two different devices attempt transmissions using the same resource units. In some aspects, the random access procedure may be based on a number of resource units within the particular category. In some aspects, a design of this procedure may consider that the greater the number of resource units in a particular category, the lower a risk of collision generally. Thus, in some aspects, an average wait time before transmission in categories two (2) or three (3) may be proportional to the number of resource units in the category. The wait time may also be randomized in some aspects. In some aspects, an average wait time may increase based on the number of resource units used for a particular transmission. Thus, in some aspects, transmissions utilizing one resource unit may wait less time before transmission (on average) than transmissions utilizing two resource units.

A device performing a category four (4) transmission discussed above may utilize a different pre-transmission procedure than a device performing a category two (2) or three (3) transmission that utilize a random access procedure as discussed above. The category four transmissions may first require a back off procedure to be performed during the transmission opportunity itself before the transmission is performed. In some aspects, the back-off procedure may include periodic checking of an idle status of the wireless network, at least with respect to the resource units planned for transmission. If the network is not idle, the back off procedure may be reset to a starting point. Otherwise, a back-off counter may be decremented in these aspects. When the backoff counter reaches a predetermined value, such as zero (0), in some aspects, the category four (4) transmission may proceed in some aspects. In other aspects, a different back-off procedure to reduce contention and/or collision may be utilized before performing a category four (4) transmission.

In some aspects, a back-off procedure is utilized that is based on enhanced distributed channel access (EDCA). In these aspects, before a category four (4) transmission occurs, the back-off procedure may count down a backoff counter until it reaches a predetermined threshold value. This may function to provide a wait time of a particular duration.

In some aspects, multiple category 4 transmissions may be performed during a transmission opportunity, with each of these multiple category 4 transmissions using a different resource unit. In some of these aspects, a separate back-off procedure may precede each of these transmissions. Thus, in these aspects, a device (e.g., station) may run one or more parallel back off procedures, each procedure associated with an individual back-off counter. The device may transmit its packet in one or more of the resource units under one or more of the following conditions (not mutually exclusive but rather depending subject to 0 or more restrictions specified by the device indicating the availability of these resources and by the capabilities of the intended receiver(s):

1) the transmission is limited to only one of the allocated resources, wherein the selection of the resource is based on the determination that, in some embodiments, the backoff counter for that resource has reached 0. Internal collisions between counters for one or more cat 4 resources may be solved internally at the device (selection based on quality of the resource (e.g., in terms of SINR), allocated bandwidth, etc.).

2) The transmission is not limited to only one of the allocated resources but rather allowed to occur on one or more of the allocated resources wherein each of the backoff counters have reached 0 (see 1)). The transmissions in the one or more allocated resources may not be limited to a single receiver, but rather may be addressed to multiple receivers, one or more for each resource unit (wherein the transmissions for multiple devices may be multiplexed in frequency, space, and/or in time)

Thus, to facilitate a multi-user uplink communication, the AP 104 may first transmit one or more frames 302 indicating parameters for each of the stations 106a and 106d to utilize during the multi-user uplink transmission (a category one (1) transmission as described above). In some aspects, the AP 104 may transmit a trigger frame 302, indicating parameters for the multi-user transmission. For example, the trigger frame 302 may indicate, among other parameters, a first set of resource units to be utilized by each of the STA 106a and the STA 106d when participating in the multi-user transmission. The first set of resource units may be divided into at least two subsets, one subset for each device participating in the multi-user transmission. For example, because the STA 106a and 106d may transmit data to the AP 104 at the same time, the two devices may utilize different subsets of the first set of resource units (e.g. frequency bands or subcarriers) to encode their respective transmissions. These subcarriers may be identified via resource units, with each resource unit identifying a particular non-overlapping portion of a frequency spectrum (via identified subcarriers). In some aspects, the trigger frame may be a request to send frame (RTS), request to transmit (RTX), clear to send (CTS), or a clear to transmit (CTX), or dedicated trigger message. Data sent by each of the stations 106a and 106d as part of a multi-user transmission defined by the trigger frame 302 is shown as messages 304a and 304b respectively in FIG. 3.

The trigger message 302 sent by the AP 104 may also indicate a second set of resource units that may be utilized by devices associated with the AP 104 for transmissions to the AP 104 for random access transmissions during the multi-user transmission (category two (2) transmissions as discussed above). FIG. 3 illustrates that station 106c may utilize this second set of resource units to send a message 306 to the AP 104 at least partially simultaneously with the messages 304a-b transmitted by the stations 106a and 106d. The station 106c may transmit the message 306 based on a random access procedure. For example, in some aspects, the random access procedure may include determining a number of resource units available for random access transmission from the trigger message and selecting a back-off time before the transmission 306 based on the number of resource units available. For example, a random number between one (1) and the number of resource units may be selected, and the back-off time selected in proportion to the random number.

The trigger message 302 may further indicate a third set of resource units that may be utilized by devices that are unassociated with the AP for random access transmissions to the access point 104 during the multi-user transmission. FIG. 3 illustrates station 106e, which is unassociated with the access point, transmitting a message 308 to the AP 104 using one or more resource units within the third set of resource units for the transmission of message 308.

The trigger message 302 may further indicate a fourth set of resource units that are available for use by devices for transmissions to devices other than the AP 104. For example, FIG. 3 illustrates that station 106f, which is unassociated with the access point, sends a message 308 to the station 106a during the multi-user transmission of messages 304a-b. The station 106f may utilize one or more resource units from the fourth set of resource units to send the message 308.

The trigger message 302 may further indicate a fifth set of resource units that are not available for use by devices for transmission, or that are available for transmissions when one or more criteria are met. This fifth set of resource units may be identified in one or more STA info fields 535 illustrated in FIG. 5.

Additional information regarding the fifth set of resource units may be provided in the trigger frame 302. For example, the trigger frame may include a reason for forbidding transmission using the resource units in the fifth set of resource units. In some aspects, criteria limiting use of the fifth set of resource units may be based on one or more transmit parameters (transmit power, modulation, number of spatial streams, duration of the transmission, etc.) for concurrent transmissions using the fifth set of resource units. Forbidding certain resource units may reduce interference for other devices using those resource units. In some aspects, those other devices those devices may not have adequately detected and managed ongoing activity (third party transmissions, radar detection, scanning, etc.) in particular frequencies overlapping with the resource units, and thus, their ability to transmit may be more negatively impacted that other devices.

Figure 4:
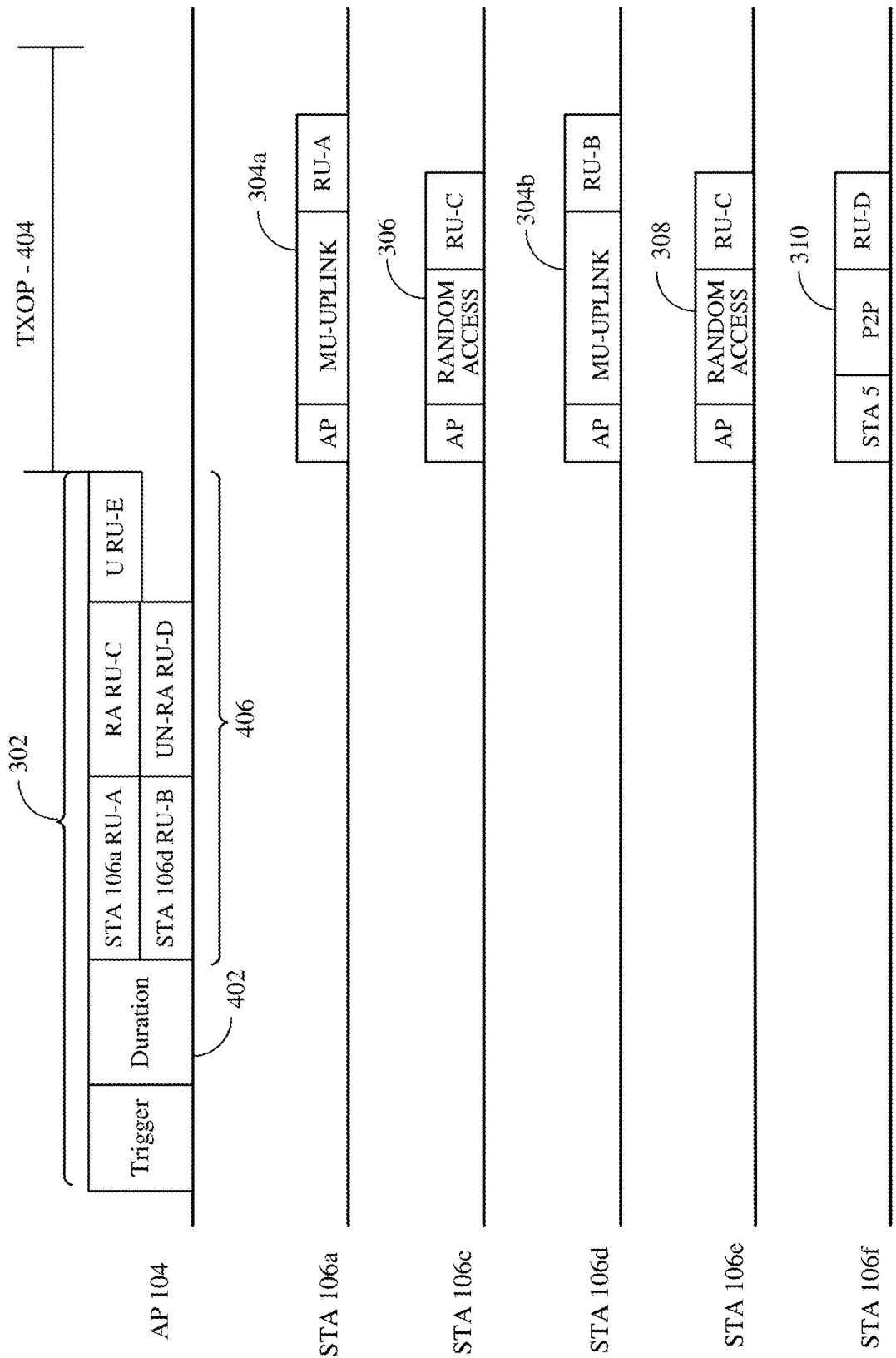
FIG. 4 is a timing diagram of messages exchanged between an access point and multiple stations.

FIG. 4 is a timing diagram of messages exchanged between an access point and multiple stations. FIG. 4 shows an AP 104 transmitting a trigger message 302. The trigger message includes a duration field 402. The duration field indicates the duration of a transmission opportunity 404. The trigger message also includes indications 406 of resource units in one or more resource sets. The resource units defined by the indications 406 may be utilized for transmissions that occur during the transmission opportunity 404.

For example, a first set of resource units may be indicated by the indications 406. This first set of resource units may be associated with a first station via the trigger message 302, for example, via identification of an association identifier for a first station, such as STA 106a. The trigger message 302 may further indicate the first station is to perform an uplink transmission using the resource set "RU-A."

The trigger message 302 may indicate a second set of resource units for a second station, such as STA 106d, is to perform an uplink transmission using resource set "RU-B" during the transmission opportunity 404.

The trigger message 302 may further indicate a third set of resource units for use by devices associated with the AP 104 for random access transmissions to the AP 104 during the transmission opportunity 404. For example, the exemplary trigger message 302 indicates resource units "RU-C" may be used for random access during the transmission opportunity 404.

The trigger message 302 may further indicate a fourth set of resource units for use by devices not associated with the AP 104 for random access transmissions to the AP 104 during the transmission opportunity 404. This is shown in FIG. 4 as resource units "RU-D."

The trigger message 302 is also shown in FIG. 4 as indicating that resource units "RU-E" may be used to transmit data during the transmission opportunity 404 (as defined by the duration field 402) to other devices that are not the AP 104. In some aspects, an AP, such as the AP 104, may experience interference conditions with certain resource units. Because these resource units are subject to interference, the AP may determine not to utilize these resource units in certain transmissions. For example, when the AP is setting up a multi-user uplink transmission, it may assign resource units to each of the stations participating in the uplink transmission that are experiencing interference conditions that meet one or more criteria. Other resource units, which do not meet the one or more criteria, may not be assigned to these stations, and thus, may be available for use by devices for transmissions to other devices. For example, if an interference source is in close proximity to an access point, another device, further from the access point and the interference source, may be able to effectively use the resource unit for transmissions to yet another device that is also not proximate to the interference source.

In some circumstances, one or more stations associated with the AP may indicate certain preferred resource units for communication with the AP. For example, a station may determine that particular resource units are experiencing interference from its respective location. For example, the station may be in proximity to an interference source for the particular resource units. The station may then indicate preferred resource units that do not include these particular resource units. The preferred resource units may then be communicated to the AP by the station, for example, in a network message indicating such. When the AP assigns resource units to this station, the assignments may consider these preferences, resulting in other, less preferred resource units remaining unassigned. These unassigned resource units may then be available for use by other devices for transmissions to yet other devices. Thus, the resource units indicated as "RU-E" in FIG. 4 may be included by the AP for category four transmissions as discussed above based on one or more of the factors discussed above. FIG. 4 also illustrates that the STAs 106a and 106d initiate a multi-user uplink transmission during the transmission opportunity 404 based on the indications 402 and 406 in the trigger message 302. For example, FIG. 4 illustrates that STA 106a transmits message 304a to the AP 104 and STA 106d transmits message 304b to the AP 104. These messages may utilize the resource units "RU-A" and "RU-B" indicated in the trigger message 302.

STA 106c, which is associated with the AP 104, performs a random access transmission 306 during the transmission opportunity 404, using resource units RU-C as indicated by the trigger message 404.

STA 106e-f are not associated with the AP 104, as they are outside the basic service set 102. See for example, FIG. 3. Thus, in some aspects, one or more of the STA 106e-f may or may not be configured to properly receive the trigger frame 302. For example, in some aspects, one or more first STAs of the STAs 106e-f may be tuned to a primary channel equivalent to a primary channel in use by the BSS 102. In these aspects, the trigger frame may be received by these first STAs. In other aspects, one or more second STAs of STAs 106e-f may be tuned to a primary channel that is different than a primary channel of the BSS 102. In these aspects, those one or more second STAs may be unable to receive the trigger frame 302. These second STAs may be unable to utilize resource units identified by the trigger frame 302.

STA 106e, which is not associated with the AP 104, performs a random access transmission 308 during the transmission opportunity 404, using resource units RU-D, as indicated by the trigger message 404. STA 106f, which happens to be unassociated with the AP 104, transmits the message 310 to the STA 106a during the transmission opportunity 404. The message 310 utilizes the "RU-D" resource unit. The trigger message 302 indicated resource unit "RU-D" is available for transmissions to other devices, and thus, the STA 106f transmitted the message 310 to the STA 106a (not to the AP 104) using resource unit "RU-D."

Figure 5A:
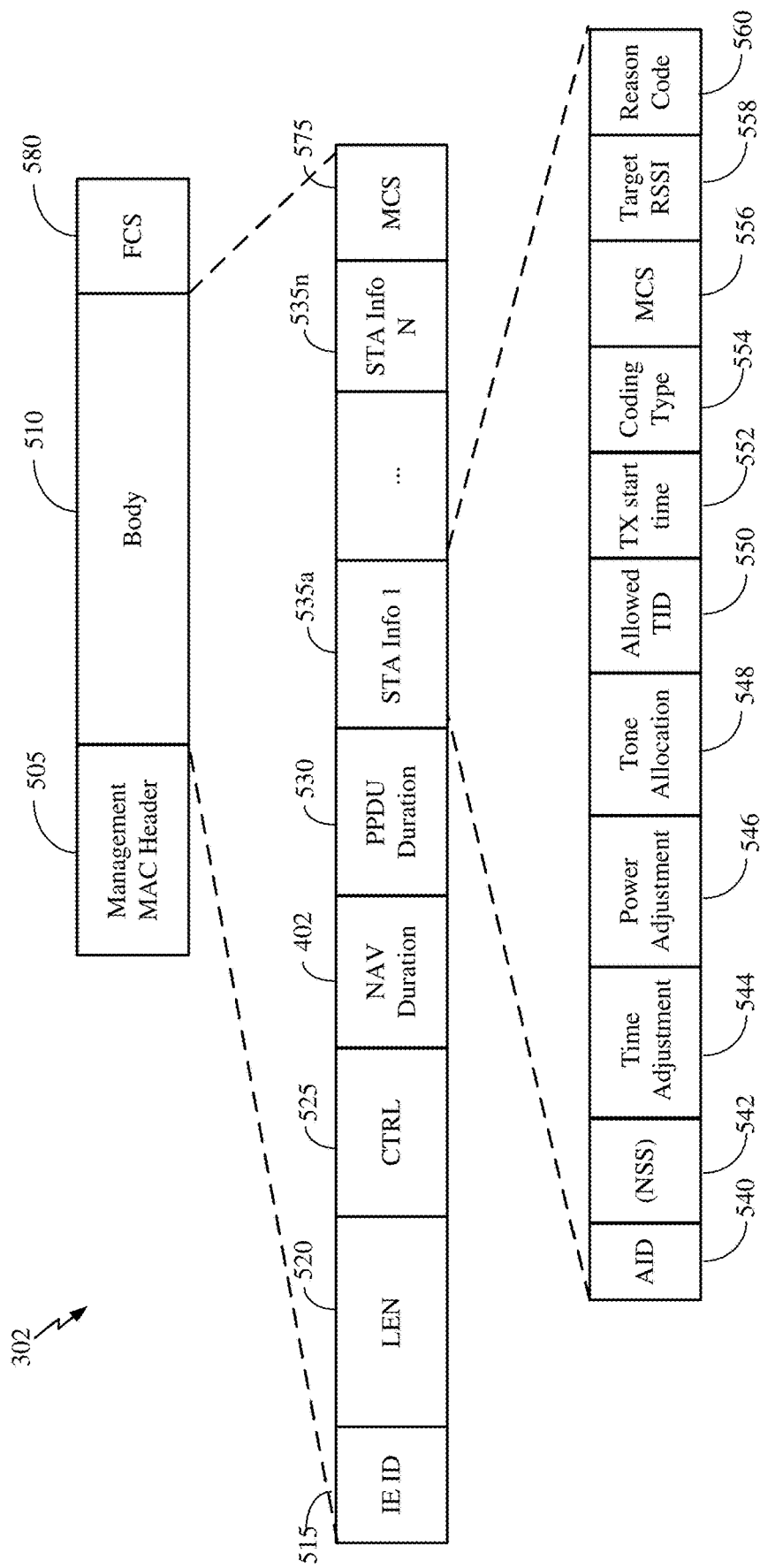
FIG. 5A is an exemplary message format of a trigger frame.

FIG. 5A is an exemplary message format of a trigger frame. The exemplary trigger frame 302 includes a media access control (MAC) header 505, a body portion 510, and a frame check sequence field 580. The header 505 may indicate the message is a trigger frame. For example, via one or more fields having one or more predetermined values, the header 505 may indicate the frame 302 is a request to transmit (RTX), clear to transmit (CTX), or a trigger frame.

The body portion 510 may include exemplary data fields as shown in FIG. 5A, to include an identification field 515, length field 520, control field 525, a duration field 402 and a PPDU duration field 530. The body portion 510 also includes one or more STA info fields, as shown fields 535a-n. The body portion 510 may also include a modulation and coding scheme field 575.

Each STA info field 535 may include one or more of an association identifier field 540, number of spatial streams field 542, time adjustment field 544, power adjustment field 546, tone allocation field 548, allowed traffic identifier field 550, a transmit start time field 552, a coding type field 554, a modulation and coding scheme field 556, a target received signal strength indicator (RSSI) field 558, and a reason code 558.

As discussed above with respect to FIG. 3 and FIG. 4, the trigger message 302 may indicate one or more sets of resource units for use in transmissions during a transmission opportunity defined by the trigger message 302. A set of resource units may be defined by the tone allocation field 548 in some aspects. In some aspects, the AID field 540 may associate a particular station with a set of resource units defined in a corresponding tone allocation field 548 (an AID field 540 and tone allocation field 548 are corresponding when they are part of the same STA info field 535). This is shown above for example with respect to messages 304a-b. The exemplary trigger message 302 shown in FIG. 4 associates the station 106a with one or more resource units identified as "RU-A" and the station 106d with one or more resource units identified as "RU-B."

In some aspects, special predetermined values for the AID field 540 may indicate resource units not reserved for a particular station or stations identified via group identifier. For example, a first predetermined value for the AID field 540 may indicate that resource units defined in a corresponding tone allocation field 548 may be used by any station associated with an access point for random access transmissions (as shown above with respect to message 306). In some aspects, the first predetermined value may be zero (0).

A second predetermined value for the AID field 540 may indicate that resource units defined in a corresponding tone allocation field 548 may be used by any station not associated with the access point for random access transmissions (as shown above in FIG. 4 with respect to message 308). In some aspects, this second predetermined value may be 2045.

A third predetermined value for the AID field 540 may indicate that resource units identified in a corresponding tone allocation field 548 may be used for transmissions to other devices, but not for transmissions to the access point transmitting the trigger message 302 (as shown above with respect to message 310). In some aspects, this third predetermined value is 2046.

In some aspects, a device receiving the trigger frame 302 may evaluate one or more criteria before utilizing resource units indicated in the trigger frame. For example, in some aspects, criteria based on one or more of the coding type field 554, modulation and coding scheme field 556, and/or the target RSSI field 558 may be evaluated before resource units identified via the third predetermined value in the association identifier field 540, discussed above, may be used for transmissions to other devices. For example, in some aspects, a device generating and transmitting the trigger frame 302 may specify a value in the target RSSI field 558. The value may define a received signal strength limit for the trigger frame 302. A particular value of the receive signal strength limit may be used to indicate that the transmission in this particular resource is forbidden, for example a certain value of this field may be assigned for this purpose (the equivalent of indicating a target rssi of minus infinity dB). If the trigger frame is received with an RSSI above the indicated limit, the resource units identified via the third predetermined value may not be utilized in some aspects. This RSSI limit functions to mitigate any impact of a transmission utilizing resource units identified via the third predetermined value for the association identifier does not interfere with transmissions from or to the device transmitting the trigger frame 302 (the AP 104 in some aspects). Other criteria for use of RU's identified in the trigger message 302 may be provided by one or more fields of the user info fields 535*a-n*.

In some aspects, the reason code field 560 may indicate one or more reasons that resource units allocated or assigned by a particular user info field were included. For example, the reason code may indicate that the identified resource units are subject to interference, or that the resource units were not preferred for use by stations participating in a communication to the access point that is configured by the trigger frame 302. The reason code field 560 may or may not be included in the user info field 535 in various aspects.

Figure 5B:
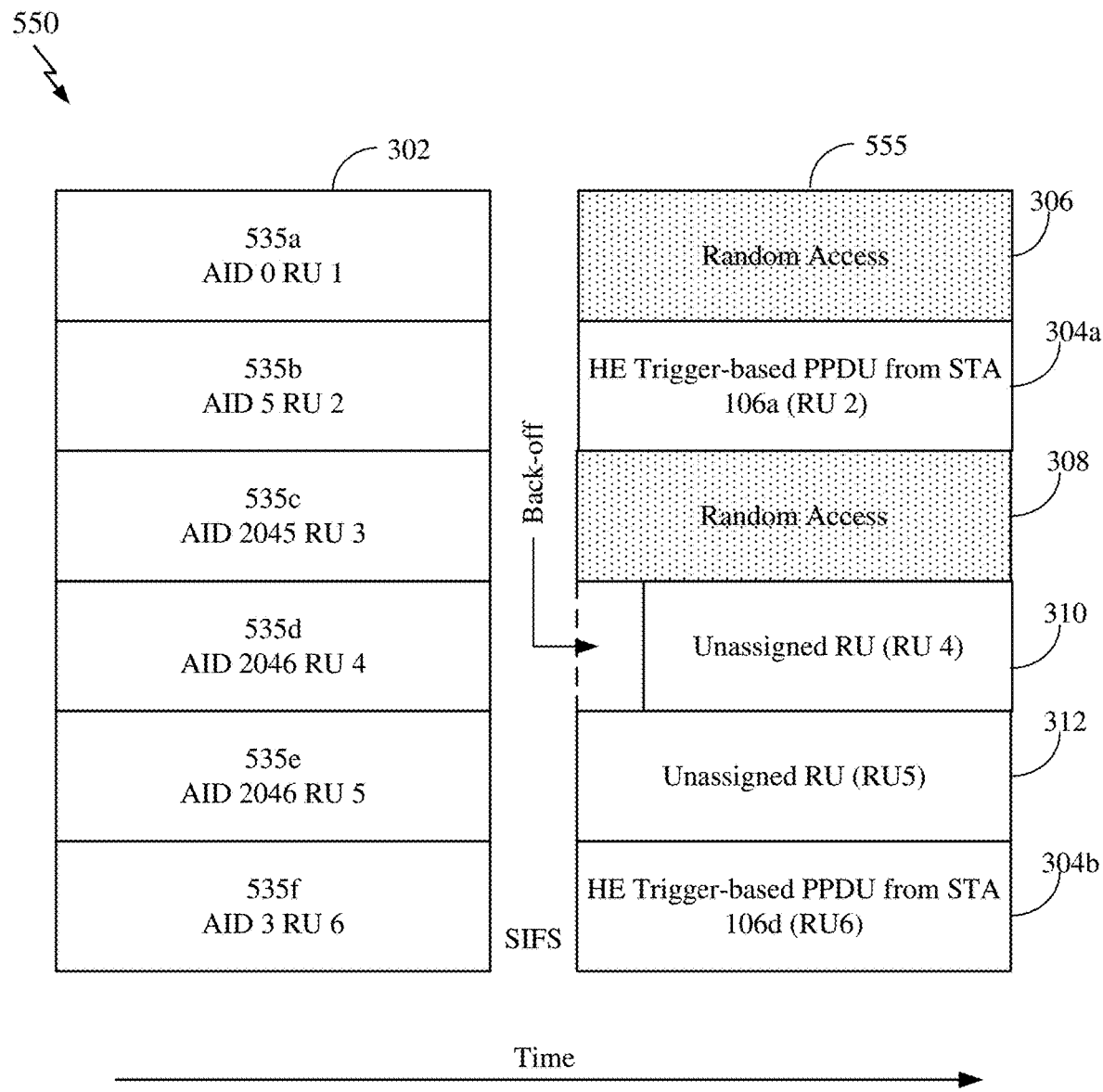
FIG. 5B shows transmission of an exemplary trigger frame and a following transmission defined by the trigger frame.

FIG. 5B shows transmission of an exemplary trigger frame and a following transmission defined by the trigger frame. The exemplary trigger frame includes a plurality of STA info fields 535*a-f*. A first user info field 535*a* includes an AID value of zero (0), in some aspects, the AID value is stored in the AID field 540 shown in FIG. 5A. This special AID value denotes, in the illustrated aspect, that RU's associated with this AID value are to be used for random access transmissions by associated devices. FIG. 5B illustrates that RU 1 is indicated in the STA info field 535*a*, in some aspects, via the tone allocation field 548 of the STA info field 535*a*.

A second STA info field 535*b* includes an AID value of five (5). In some aspects, the AID value is stored in the AID field 540 of the STA info field 535*b*. FIG. 5B further illustrates that RU 2 is indicated in the STA info field 535*b*, in some aspects, in the tone allocation field 548. In some aspects, these RU's are for category two (2) transmissions as described above. In various aspects, the specific value of the AID indicating RU's available for transmissions for category two (2) transmissions may vary from the example in FIG. 5B.

A third STA info field 535*c* indicates an AID value of 2045. In some aspects, 2045 may be a predetermined value designated to indicate that RU's associated with that AID value are reserved for random access transmissions by devices unassociated with an access point transmitting the trigger frame 302. In some aspects, these RU's are for category three (3) transmissions as described above. In various aspects, the specific value of the AID indicating RU's available for transmissions for category three (3) transmissions may vary from the example in FIG. 5B.

A fourth STA info field 535*d* indicates an AID value of 2046. In some aspects, 2046 may be a predetermined value designated to indicate that RU's associated with that AID value are available for transmissions to other devices that are not the access point transmitting the trigger message 302. In some aspects, these RU's are for category four (4) transmissions as described above. In various aspects, the specific value of the AID indicating RU's available for transmissions for category four (4) transmissions may vary from the example in FIG. 5B.

A fifth STA info field 535*e* also indicates an AID value of 2046. In some aspects, 2046 may be a predetermined value designated to indicate that RU's associated with that AID value are available for transmissions to other devices that are not the access point transmitting the trigger message 302. In some aspects, these RU's are for category four (4) transmissions as described above. In various aspects, the specific value of the AID indicating RU's available for transmissions for category four (4) transmissions may vary from the example in FIG. 5B.

A sixth STA info field 535*f* includes an AID value of three (3). In some aspects, the AID value may be included in an AID field 540 of the user info field 535*f*. The STA info field 535*f* also indicates RU 6 is associated with the AID three. In the example of FIG. 5B, the STA info field 535*f* indicates that an STA identified by AID 3 may use RU 6 to perform an uplink transmission to the AP 104 transmitting the trigger frame 302.

FIG. 5B also shows a transmission 555 following the transmission of the trigger frame 302 by a SIFS time. The transmission 555 is comprised of the various messages shown in FIG. 3, that is, portions of a multi-user transmission to the AP 104, messages 304*a-b*, in accordance with STA info fields 535*b* and 535*f*. The transmission 555 also includes random access transmission 306 from a device associated with the AP 104, in accordance with STA info field 535*a*. The transmission 555 also includes random access transmission 308 from a device unassociated with the AP 104, in accordance with STA info field 535*c*. The transmission 555 also includes transmission from a device to another device that is not the AP 104 310, in accordance with STA info field 535*d*. The transmission 555 may also not utilize some RUs, such as RU's identified by STA info field 535*e*.

Figure 6:
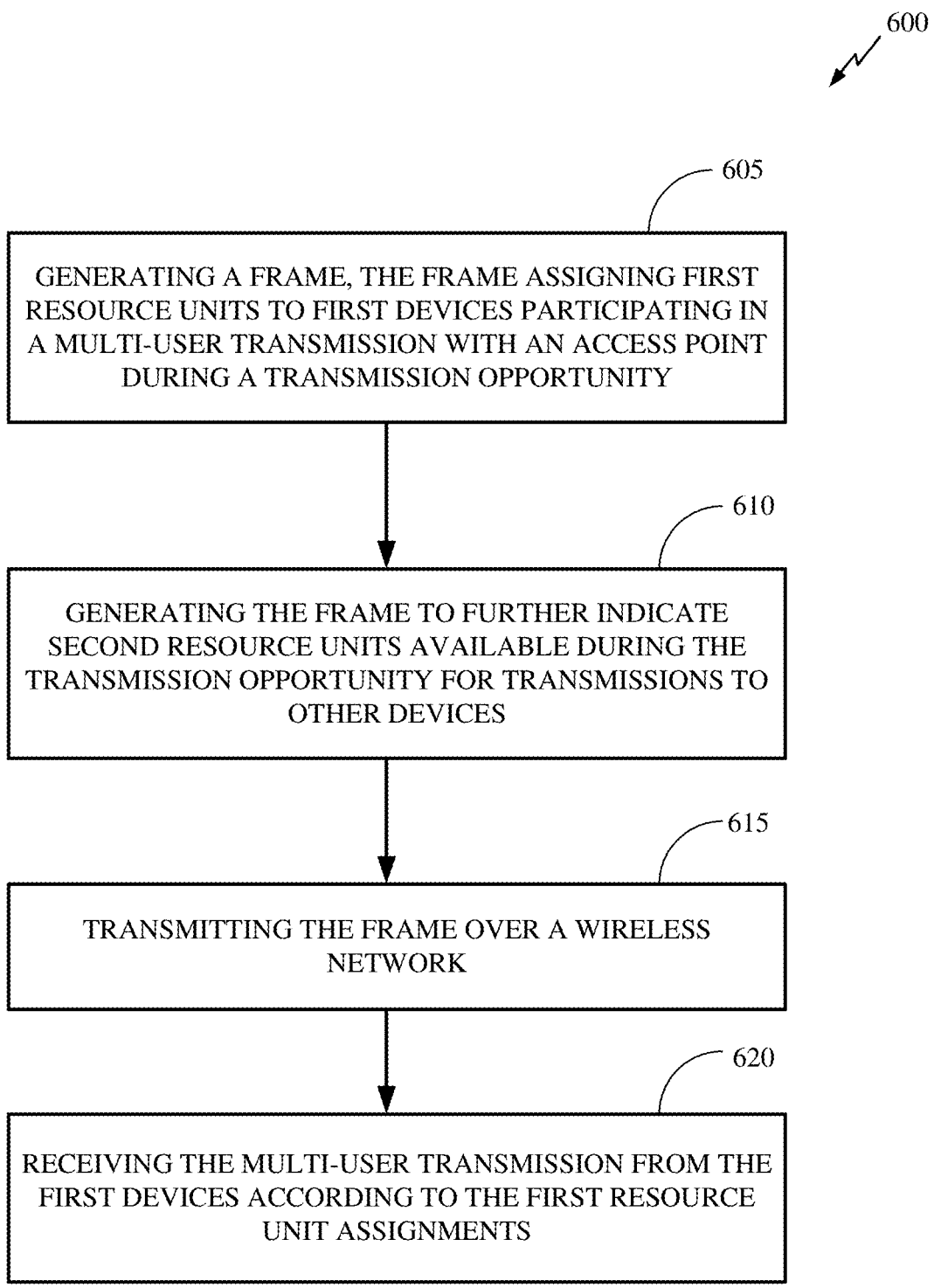
FIG. 6 is a flowchart of a method of wireless communication.

FIG. 6 is a flowchart of a method of wireless communication. In some aspects, the process 600 discussed below with respect to FIG. 6 may be performed by the wireless device 202, and specifically, in some aspects, by the hardware processor 204. For example, instructions stored in the memory 206 may configure the processor 204 to perform one or more of the functions discussed below with respect to process 600.

Process 600 enables a wireless device, such as an access point, to generate a trigger frame defining how resource units may be utilized during a transmission opportunity. The transmission opportunity may be defined, at least in part, by the trigger frame itself. For example, as discussed above, a duration field included in the trigger frame may indicate that devices should set their network allocation vector (NAV) for a time period indicated by the duration field. Any transmissions occurring during the time period may be in accordance with indications included in the trigger frame. The trigger frame generated and transmitted by process 600 includes indications of resource units that may be used for transmissions to other devices, besides the device (e.g. access point) generating and transmitting the trigger frame itself. By explicitly defining these resource units, utilization of a wireless medium may be improved over methods which do not define resource units for transmissions to devices other than the device transmitting the message. In the description of FIG. 6 below, a device performing process 600 may be referred to as an executing device.

Block 605 generates a frame (e.g., a trigger frame) to assign a first set of resource units to first devices participating in a multi-user transmission with the executing device. In various aspects, the frame may be generated as a request to transmit (RTX) frame, a clear to transmit (CTX) frame, or as a dedicated trigger frame. For example, predetermined values in a frame type and frame subtype field of the frame may be used for such an indication. In some aspects, the first set of resource units may be partitioned into sub-sets, with each subset assigned to a particular device participating in the multi-user transmission. For example, as shown above with respect to FIG. 3 and FIG. 4, stations 106a and 106d are assigned resource units RU-A and RU-B, and participate in a multi-user transmission 304 via messages 304a-b. Generating the frame in block 605 may include initiating a portion of memory of a device with data values for the frame, in accordance with a frame format, such as the frame format shown in FIG. 5A.

In block 610, the frame (e.g., the trigger frame) is further generated to indicate a second set of resource units that are available during a transmission opportunity for transmissions to other devices. The other devices being devices that are not the executing device (an access point in some aspects). Thus, in one non-limiting example, the frame may be generated to indicate a second set of resource units that are unavailable for transmission during the transmission opportunity. It will be appreciated, then, that other devices (e.g., STAs that are not a recipient of the frame and/or an AP in an overlapping BSS (OBSS), etc.) may thus be enabled to utilize the second set of resource units in this non-limiting example. As shown above in the exemplary trigger frame 302 of FIG. 5A, in some aspects, the second set of resource units may be indicated by setting the AID field 540 to a particular predetermined value and setting the corresponding tone allocation field 548 to indicate the resource units included in the second set of resource units. In some aspects, the particular predetermined value is 2046, as shown for example, in the exemplary trigger frame of FIG. 5B.

In some aspects of block 610, the frame (e.g., the trigger frame) is generated to indicate one or more criteria for use of the second set of resource units. For example, in some aspects, one or more of the coding type field 554, modulation and coding scheme field 556, and target received signal strength indicator (RSSI) field 558 may be set to values that indicate the criteria. Thus, in one non-limiting example, the frame may be further generated to indicate whether the access point permits one or more other devices to utilize the second resource units. For instance, in this non-limiting example, a bit in a field (e.g., a common info field or a user info field) of the frame may be set to indicate that the AP permits (or does not permit) other devices (e.g., STAs that are not a recipient of the frame and/or an AP in an overlapping BSS (OBSS), etc.) to utilize unassigned resource units (e.g., the second resource units, in this example). As another non-limiting example, the target RSSI field 558 in the frame may define an RSSI limit of the frame, above which, the second set of resource units may not be utilized for transmissions to other devices. In other words, a device receiving the frame generated in blocks 605 and 610 may compare an RSSI of the frame as received to the limit, and if the limit is exceeded, that receiving device may be unable to utilize the second set of resource units. Similar criteria may be provided via other fields of the trigger frame 302, such as the coding type field 554 and/or modulation and coding type field 556.

In some aspects, the executing device may set criteria for use of the second set of resource units that can never be met. For example, the executing device may set an artificially low RSSI limit value (such as zero 0), that will prevent receiving devices complying with the criteria from ever determining that the second set of resource units are available for transmission. This provides a mechanism for the executing device to effectively forbid use of particular resource units from being used.

In some aspects of block 610, the frame is generated to indicate one or more reasons the second set of resource units were identified for use in transmissions to other devices. These reasons may be indicated in the reason code field 560 illustrated in FIG. 5A. For example, in some aspects, an access point may determine that one or more resource units are subject to interference. For example, another device in close proximity to the access point may be performing frequent transmissions using those resource units. In these aspects, the access point may generate the frame to indicate a reason of "too much interference." This may be indicated, in some aspects, via a reason code of zero (0) (e.g. in the reason code field 560 in some aspects). In some aspects, the frame may be generated to indicate the second set of resource units were identified because they are not used, there is no traffic or stations available to support use of the resource units. In some aspects, the frame may be generated to indicate the second set of resource units were not used by the executing device due to a detection of a radar transmission within one or more of the second set of resource units.

In some aspects of block 610, the frame may be further generated to indicate a third set of resource units to be used for random access transmissions by devices associated with the executing device. As discussed above, in some aspects, these resource units may be identified via a predetermined value of the AID field 540. The predetermined value may not correspond to an actual AID of a real device but may be another value. The third set of resource units may be identified via a corresponding tone allocation field 548.

In some aspects of block 610, the frame may be further generated to indicate a fourth set of resource units to be used for random access transmissions to the executing device by devices not associated with the executing device. As described above, a unique predetermined value in the AID field 540 indicating that resource units identified in a corresponding tone allocation field 548 are for use in random access transmissions to the executing device by other devices not associated with the executing device. As shown in FIG. 3, if the AP 104 is the executing device, then station 106e may transmit a message 308 to the AP 104 during a transmission opportunity, such as TXOP 404 shown in FIG. 4. The generation of the frame in block 610 may include further initializing the portion of memory according to a frame format, such as the frame format shown in FIG. 5A to provide the indications as described above with respect to block 610. In some aspects, block 605 and 610 may be performed by the hardware processor 204.

In block 615, the frame is transmitted over a wireless network. Transmitting the frame over the wireless network may include calling an application programming interface (API) to transmit the frame and passing the API a pointer to the memory initialized according to the frame format. The API may interface with the transmitter 210 to perform the physical transmission. Transmitting the frame may also include checking a result code of the API to confirm the transmission operation completed successfully. In some aspects, block 615 may be performed by the transmitter 210.

In block 620, the multi-user transmission is received from the first devices according to the first resource unit assignments defined in the frame. Receiving the multi-user transmission in block 620 may include receiving data from a first device and receiving data from a second device. In some aspects, block 620 may be performed by the receiver 212.

In some aspects, the functions described herein may comprise, in a non-limiting example, an apparatus for wireless communication, comprising: a hardware processor configured to generate, by an access point, a frame, the frame assigning first resource units to first devices participating in a multi-user transmission with the access point during a transmission opportunity, and further indicating second resource units available during the transmission opportunity for transmissions to other devices; a transmitter configured to transmit the frame; and a receiver configured to receive the multi-user transmission from the first devices according to the resource unit assignments. In some aspects, the hardware processor is further configured to generate the frame to include a predetermined association identifier to indicate the second resource units are available during the transmission opportunity for transmissions to other devices. In some aspects, the hardware processor is further configured to indicate the predetermined association identifier in a user info field of the frame. In some aspects, the hardware processor is further configured to generate the frame to further indicate one or more criteria for utilizing the second resource units. In some aspects, generating the frame to indicate one or more criteria comprises generating the frame to further indicate a received signal strength (RSSI) limit for the frame, the frame indicating that if the RSSI of the frame when received is above the limit, the second resource units are not available during the transmission opportunity. In some aspects, the hardware processor is further configured to indicate the received signal strength threshold in a user info field of the frame. In some aspects, the hardware processor is further configured to: determine the second resource units are subject to interference; and generate the frame to indicate the determination. In some aspects, the hardware processor is further configured to generate the frame to indicate the second set of resource units are not necessary for existing traffic or existing stations. In some aspects, the hardware processor is further configured to generate the frame to associate a predetermined association identifier with the second resource units to indicate they are available during the multi-user transmission for transmissions to other devices. In some aspects, the hardware processor is further configured to generate the frame to indicate the second resource units are available for transmissions after a back-off period occurring during the multi-user transmission. In some aspects, the hardware processor is further configured to generate the frame to assign third resource units for random access transmissions to the access point by devices associated with the access point. In some aspects, the hardware processor is further configured to generate the frame to associate a second predetermined association identifier with the third resource units to indicate they are for random access transmissions to the access point by devices associated with the access point. In some aspects, the hardware processor is further configured to generate the frame to assign fourth resource units for random access transmissions to the access point by devices unassociated with the access point. In some aspects, the second resource units consist of a single resource unit.

In some aspects, the functions described herein may comprise, in a non-limiting example, a non-transitory computer readable medium comprising instructions that when executed configure a hardware processor to perform a method for wireless communication, the method comprising: generating, by an access point, a frame, the frame assigning first resource units to first devices participating in a multi-user transmission with the access point during a transmission opportunity, and further indicating second resource units available during the transmission opportunity for transmissions to other devices; transmitting the frame; and receiving the multi-user transmission from the first devices according to the resource unit assignments.

Figure 7:
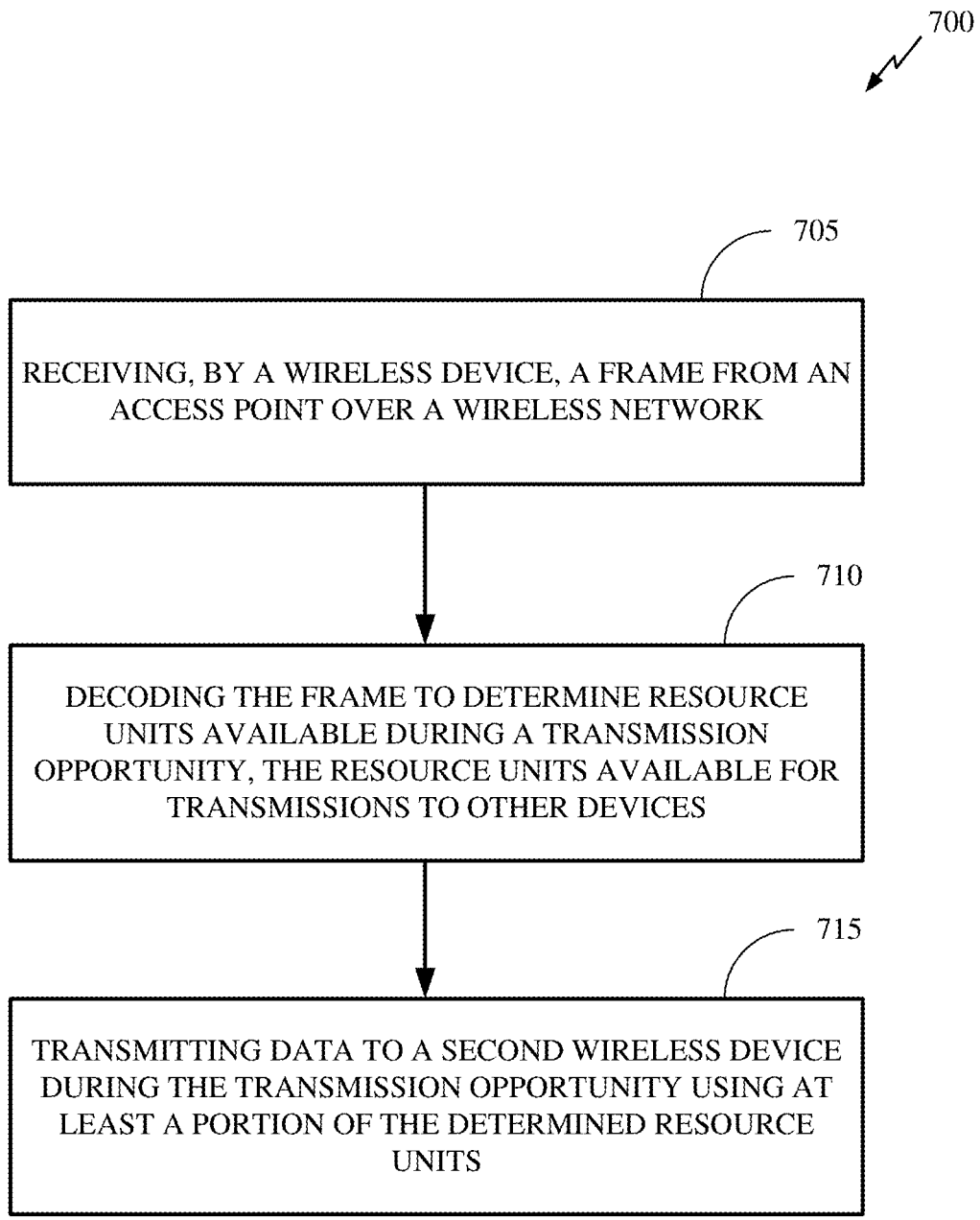
FIG. 7 is a flowchart of a method of wireless communication.

FIG. 7 is a flowchart of a method of wireless communication. In some aspects, the process 700 discussed below with respect to FIG. 7 may be performed by the wireless device 202, and specifically, in some aspects, by the hardware processor 204. For example, instructions stored in the memory 206 may configure the processor 204 to perform one or more of the functions discussed below with respect to process 700.

Process 700 enables a wireless device, such as an access point, to receive a trigger frame defining how resource units may be utilized during a transmission opportunity. The transmission opportunity may be defined, at least in part, by the trigger frame itself. The receiving device may decode the trigger frame to determine resource units to be utilized for particular types of transmissions, as discussed above with respect to FIG. 3 and FIG. 4 for example. As discussed above, a duration field included in the received trigger frame may be decoded by a receiving device to determine it should set its network allocation vector (NAV) for a time period indicated by the duration field. Any transmissions occurring during the time period by the receiving device may be in accordance with indications decoded from the received trigger frame. The trigger frame received and decoded by process 700 includes indications of resource units that may be used for transmissions to other devices, besides the device (e.g. access point) generating and transmitting the trigger frame itself. By explicitly decoding indications of these resource units from the received frame, utilization of a wireless medium may be improved over methods which do not define resource units for transmissions to devices other than the device transmitting the frame. In the description of FIG. 7 below, a device performing process 700 may be referred to as a receiving device.

In block 705, a receiving device receives a frame from an access point over a wireless network. In some aspects, the frame may include one or more of the fields shown in exemplary frame 302 of FIG. 5A. In some aspects, the frame may be received by a station associated with the access point. In some other aspects, the frame may be received by a station that is not associated with the access point. As used here, being associated with the access point implies that the station is operating within the same basic service set (BSS) as the access point and has performed an association procedure (e.g. association request/reply message handshake) with the access point. In some aspects, the receiving device may have previously received an association response message from the access point, the association response message indicating an association identifier (AID) assigned to the receiving device. In some aspects, block 705 is performed by the receiver 212.

In some aspects, block 705 includes decoding the frame to determine a duration of the transmission opportunity. For example, in some aspects, the duration field 402 may be decoded from the received frame to determine a duration of a transmission opportunity, such as transmission opportunity 404 illustrated in FIG. 4. In some aspects, while the receiving of the frame is performed by the receiver 212, the decoding may be performed by the hardware processor 204.

In block 710, the frame is decoded by the receiving device to identify resource units available during a transmission opportunity. The identified resource units are indicated by the access point to be available for transmissions to other devices, the other devices not including the access point. In some aspects, the resource units may be identified via a predetermined value for the AID field 540, discussed above with respect to FIG. 5A. If the particular predetermined value for the AID field 540 is identified in the received frame, then a corresponding tone allocation field 548 may indicate the identified resource units in some aspects. In some aspects, the predetermined value for the AID field is 2046.

In some aspects of block 710, the frame is also decoded to identify one or more criteria associated with use of the resource units. For example, in some aspects, the frame may include indications of one or more of a coding type, modulation and coding scheme, or received signal strength limit associated with use of the resource units identified in block 710. In various aspects, these values may be indicated in a user info field, such as the user info field 535 illustrated in FIG. 5A. In some aspects, one or more of the coding type field 554, modulation and coding scheme field 556, and target RSSI field 558 may indicate these values.

In some aspects, an RSSI limit may be indicated in the frame (e.g. in the target RSSI field 558). In these aspects, process 700 may include determining or measuring an RSSI of the received frame. The measured RSSI of the received frame may be compared to the RSSI limit indicated in the frame (e.g. in the target RSSI field 558). If the measured RSSI is below the indicated RSSI limit, the receiving device may determine the resource units identified in block 710 may be utilized for transmissions to other devices in block 715 below. If the measured RSSI is above the limit, the receiving device may be inhibited from utilizing the resource units for transmissions to other devices, and thus, in these conditions, block 715 below may not be performed.

In some aspects of block 710, the frame is decoded to identify one or more reasons the identified resource units are available for transmissions to other devices. As discussed above, in some aspects, the frame may indicate that the resource units were subject to interference, and thus, were not utilized for transmissions to/from the access point. The frame may alternatively indicate the resource units were not necessary, as there was no traffic and/or stations available to support use of the resource units. In some aspects, the receiving device may determine whether to utilize the resource units for transmissions to other devices based on the one or more reasons. For example, resource units that are identified as being subject to interference may not be utilized. In some aspects, the receiving device may condition use of the resource units on a proximity to the access point. For example, if the resource units are subject to interference at an access point sending the frame, and the access point is within a threshold distance of the receiving device, the receiving device may determine that a successful transmission using the resource units is less likely and may determine not to utilize the resource units. In some aspects, block 710 is performed by the hardware processor 204.

In block 715, the receiving device transmits data to a second device during the transmission opportunity. The second device is not the access point. The transmission of the data utilizes one or more of the resource units identified in block 710 to perform the transmission. Utilizing a resource unit may comprise, in some aspects at least, encoding at least a portion of the data using one or more frequency ranges identified by the resource unit(s). In some aspects of block 715, before the data is transmitted to the second device, a back-off procedure is performed during the transmission opportunity. Many different types of back-off procedures are contemplated. However, one exemplary back-off procedure includes periodically checking whether the wireless network is idle and decrementing a counter when the network is idle. If the network is detected to be busy, the back-off counter may be reset in some aspects. If the back-off counter reaches a predetermined threshold value (such as zero (0)), the backoff procedure may be considered to be completed.

In some aspects, process 700 includes decoding the received frame to determine a second set of resource units available during the transmission opportunity for random access transmissions to the access point. The second set of resource units may be available for devices associated with the access point. A third set of resource units may be available for random access transmissions to the access point by devices unassociated with the access point, as described above with respect to FIG. 3 and FIG. 4. These second and third sets of resource units may be identified by decoding the AID field 540 and finding it has second and third predetermined values. For example, resource units for random access transmissions by associated devices may be identified via an AID value in field 540 of zero (0) in some aspects. Resource units for random access transmissions by unassociated devices may be identified via an AID value in field 540 of 2045 in some aspects.

The receiving device may perform a random access procedure before using the identified resource units for a random access transmission in accordance with the received frame. A variety of random access procedures are contemplated, but one exemplary procedure may include determining a numerical range based on a number of resource units available in a particular category (e.g. for associated or unassociated devices). A random number within the range may then be selected, and a wait time determined based on the random number. For example, the wait time may be proportional or inversely proportional to the random number in various aspects. After the wait time, a transmission using the one or more identified resource units may be performed. In some aspects, the range may be determined based on the number of resource units planned for the transmission. For example, if ten (10) resource units are identified for random access, and a planned transmission will utilize five of the ten resource units, the range used to select the random number may be larger than if only one resource unit of the ten is used for the planned transmission. In some aspects, one or more portions of block 715 may be performed by the transmitter 210. For example, in some aspects, the transmitter 210 may transmit the frame discussed with respect to block 715, any decoding and/or criteria determinations may be performed by the hardware processor 204.

In some aspects, the functions described herein may comprise, in a non-limiting example, an apparatus for wireless communication, comprising: a receiver configured to receive a frame from an access point over a wireless network; a hardware processor configured to decode the frame to determine resource units available during a transmission opportunity to the access point, the resource units available for transmissions to other devices; and a transmitter configured to transmit data to a wireless device using at least a portion of the determined resource units. In some aspects, the hardware processor is further configured to perform a back-off procedure during the transmission opportunity, and the transmitter is further configured to transmit the data to the wireless device in response to completion of the back-off procedure. In some aspects, the hardware processor is further configured to decode the frame to identify a predetermined association identifier and determine the resource units are available during the transmission opportunity for transmissions to other devices based on the identification. In some aspects, the hardware processor is further configured to decode a user info field of the frame to identify the predetermined association identifier. In some aspects, the hardware processor is further configured to decode the frame to identify one or more criteria for use of the second resource units, and the transmitter is further configured to transmit the data in response to the criteria being met. In some aspects, decoding the frame to identify one or more criteria comprises decoding the frame to determine a received signal strength (RSSI) limit for use of the second resource units during the transmission opportunity, comparing a received signal strength of the frame to the received signal strength threshold, and wherein transmitting the data in response to the criteria being met comprises transmitting the data in response to the received signal strength being below the RSSI limit.

In some aspects, the hardware processor is further configured to decode a user info field of the frame to identify the received signal strength threshold. In some aspects, the hardware processor is further configured to decode the frame to determine a reason the second resource units are available for transmissions to other devices during the transmission opportunity; and the transmitter is configured to transmit the data in response to the reason. In some aspects, the hardware processor is further configured to decode the frame to determine a duration of the transmission opportunity. In some aspects, the hardware processor is further configured to decode the frame to determine a second set of resource units available during the transmission opportunity for random access transmissions to the access point by devices associated with the access point. In some aspects, the hardware processor is further configured to: perform a random access procedure before transmitting data using one or more of the second set of resource units, wherein performing the random access procedure comprises: determine a number of resource units in the second set of resource units, and determining a numerical range based on the number; select a random number from the range; and wait a period of time based on the random number, wherein the transmitter is configured to transmit the data using one or more of the second set of resource units is performed after waiting the period of time. In some aspects, the hardware processor is further configured to decode the frame to determine a second set of resource units available during the transmission opportunity for random access transmissions to the access point by devices unassociated with the access point. In some aspects, the determined resource units consist of a single resource unit.

In some aspects, the functions described herein may comprise, in a non-limiting example, a non-transitory computer readable medium comprising instructions that when executed configure a hardware processor to perform a method for wireless communication, the method comprising: receiving, by a wireless device, a frame from an access point over a wireless network; decoding, by the wireless device, the frame to determine resource units available during a transmission opportunity to the access point, the resource units available for transmissions to other devices; and transmitting, by the wireless device, data to a second wireless device using at least a portion of the determined resource units.

In the above description, reference numbers may have been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor or any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

In one or more aspects, the functions described may be implemented in hardware, software, firmware, or any combination thereof. If implemented in software, the functions may be stored on or transmitted over as one or more instructions or code on a computer-readable medium.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for wireless communication, comprising:
    transmitting, from an access point, a frame, the frame comprising:
        one or more first info fields assigning a first set of one or more resource units to a first set of one or more devices participating in a multi-user transmission with the access point during a transmission opportunity, each of the one or more first info fields including an association identifier of a first set of one or more association identifiers, and each resource unit of the first set of one or more resource units being associated with an association identifier of the first set of one or more association identifiers, wherein each association identifier of the first set of one or more association identifiers corresponds to at least one device of the first set of one or more devices; and
        one or more second info fields indicating a second set of one or more resource units in one or more resource allocation fields of the one or more second info fields, each of the one or more second info fields including a second association identifier, and each resource unit of the second set of one or more resource units being associated with the second association identifier, wherein the second association identifier indicates that the second set of one or more resource units are unassigned for transmission to the access point during the transmission opportunity; and
    receiving, at the access point, the multi-user transmission from at least one of the first set of one or more devices according to the first set of one or more resource units assigned in the frame.

2. The method of claim 1, further comprising indicating a received signal strength threshold in at least one of the one or more second info fields of the frame.

3. The method of claim 1, further comprising indicating, based on indicating that the second set of one or more resource units are unassigned for transmission to the access point during the transmission opportunity, that the second set of one or more resource units are available for use by one or more other devices.

4. The method of claim 1, wherein the frame indicates one or more criteria for utilizing the second set of one or more resource units.

5. The method of claim 4, wherein the frame indicates whether the access point permits one or more other devices to utilize the second set of one or more resource units.

6. The method of claim 4, wherein the frame further indicates a received signal strength indicator (RSSI) limit for the frame, the frame indicating that if an RSSI of the frame when received is above the RSSI limit, the second set of one or more resource units are unassigned for transmission to the access point during the transmission opportunity.

7. The method of claim 1, wherein the frame indicates that the second set of one or more resource units are not necessary for existing traffic or existing stations.

8. The method of claim 1, wherein the frame associates the second association identifier with the second set of one or more resource units to indicate that the second set of one or more resource units are unassigned for transmission to the access point during the multi-user transmission.

9. The method of claim 1, wherein the frame indicates that the second set of one or more resource units are unassigned for transmissions after a back-off period occurring during the multi-user transmission.

10. The method of claim 1, wherein the frame assigns a third set of one or more resource units for random access transmissions to the access point by devices associated with the access point.

11. The method of claim 10, wherein the frame associates a third association identifier with the third set of one or more resource units to indicate that they are for random access transmissions to the access point by devices associated with the access point.

12. The method of claim 10, wherein the frame assigns a fourth set of one or more resource units for random access transmissions to the access point by devices unassociated with the access point.

13. The method of claim 1, wherein the second set of one or more resource units consist of a single resource unit.

14. The method of claim 1, wherein the frame indicates that the second set of one or more resource units are subject to interference.

15. A method for wireless communication, comprising:
    receiving, by a wireless device, a frame from an access point over a wireless network, the frame comprising:
        one or more first info fields assigning a first set of one or more resource units to a first set of one or more devices participating in a multi-user transmission with the access point during a transmission opportunity, each of the one or more first info fields including an association identifier of a first set of one or more association identifiers, and each resource unit of the first set of one or more resource units being associated with an association identifier of the first set of one or more association identifiers, wherein each association identifier of the first set of one or more association identifiers corresponds to at least one device of the first set of one or more devices; and one or more second info fields indicating a second set of one or more resource units in one or more resource allocation fields of the one or more second info fields, each of the one or more second info fields including a second association identifier, and each resource unit of the second set of one or more resource units being associated with the second association identifier, wherein the second association identifier indicates that the second set of one or more resource units are unassigned for transmission to the access point during the transmission opportunity; and transmitting, by the wireless device, data to a second wireless device using at least a portion of the second set of one or more resource units.

16. The method of claim 15, further comprising:

performing, by the wireless device, a back-off procedure during the transmission opportunity; and transmitting, by the wireless device, the data to the second wireless device in response to completion of the back-off procedure.

17. The method of claim 15, further comprising:

decoding, by the wireless device, the frame to identify, in the one or more second info fields of the frame, the second association identifier and indications of the second set of one or more resource units, wherein the second set of one or more resource units are unassigned for transmission to the access point during the transmission opportunity in accordance with the one or more second info fields including the second association identifier and the indications of the second set of one or more resource units.

18. The method of claim 15, wherein the frame indicates that the second set of one or more resource units are available for use by one or more other devices.

19. An apparatus for wireless communication, comprising:

one or more transmitters configured to transmit a frame, the frame comprising:

one or more first info fields assigning a first set of one or more resource units to a first set of one or more devices participating in a multi-user transmission with an access point during a transmission opportunity, each of the one or more first info fields including an association identifier of a first set of one or more association identifiers, and each resource unit of the first set of one or more resource units being associated with an association identifier of the first set of one or more association identifiers, wherein each association identifier of the first set of one or more association identifiers corresponds to at least one device of the first set of one or more devices; and one or more second info fields indicating a second set of one or more resource units in one or more resource allocation fields of the one or more second info fields, each of the one or more second info fields including a second association identifier, and each resource unit of the second set of one or more resource units being associated with the second association identifier, wherein the second association identifier indicates that the second set of one or more resource units are unassigned for transmission to the access point during the transmission opportunity; and one or more receivers configured to receive the multi-user transmission from at least one of the first set of one or more devices according to the first set of one or more resource units assigned in the frame.

* * * * *